US011948726B2

(12) United States Patent
Yoshioka et al.

(10) Patent No.: US 11,948,726 B2
(45) Date of Patent: Apr. 2, 2024

(54) INDUCTOR COMPONENT

(71) Applicant: Murata Manufacturing Co., Ltd., Kyoto-fu (JP)

(72) Inventors: Yoshimasa Yoshioka, Nagaokakyo (JP); Shinji Otani, Nagaokakyo (JP); Hiroki Imaeda, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 746 days.

(21) Appl. No.: 16/843,636

(22) Filed: Apr. 8, 2020

(65) Prior Publication Data

US 2020/0373074 A1 Nov. 26, 2020

(30) Foreign Application Priority Data

May 21, 2019 (JP) ................................ 2019-095376

(51) Int. Cl.
*H01F 27/29* (2006.01)
*H01F 27/255* (2006.01)

(52) U.S. Cl.
CPC ........... *H01F 27/29* (2013.01); *H01F 27/255* (2013.01)

(58) Field of Classification Search
CPC ............... H01F 17/0006; H01F 27/255; H01F 27/2828; H01F 27/29
See application file for complete search history.

(56) References Cited

U.S. PATENT DOCUMENTS 8,630,080 B2 * 1/2014 Iwanaga ................ H01G 4/005 361/321.1
2001/0017420 A1 * 8/2001 Iwao ................... H01F 17/0013 257/693
2001/0026017 A1 10/2001 Seto
2012/0243143 A1 9/2012 Iwanaga et al.
2016/0055961 A1 * 2/2016 Gu .......................... H01F 17/04 29/602.1
2017/0006704 A1 * 1/2017 Yoshioka ................ H01F 5/003
2017/0169930 A1 * 6/2017 Kudo .................. H01F 17/0013
2017/0290163 A1 * 10/2017 Hirota .................. H01G 4/1236
2019/0115150 A1 4/2019 Yoshioka et al.

FOREIGN PATENT DOCUMENTS

CN 1172413 A 2/1998
CN 102693835 A 9/2012
CN 109671551 A 4/2019
(Continued)

OTHER PUBLICATIONS

An Office Action; "Notice of Reasons for Refusal," mailed by the Japanese Patent Office dated Jan. 5, 2022, which corresponds to Japanese Patent Application No. 2019-095376 and is related to U.S. Appl. No. 16/843,636 with English language translation.

*Primary Examiner* — Holly Rickman
*Assistant Examiner* — Linda N Chau
(74) *Attorney, Agent, or Firm* — Studebaker & Brackett PC

(57) ABSTRACT

An inductor component comprising a main body part including a magnetic layer containing a resin and a metal magnetic powder contained in the resin; an inductor wiring disposed in the main body part; an external terminal exposed from the main body part; and a lead-out wiring electrically connecting the inductor wiring and the external terminal. Also, an outer surface of the external terminal includes a concave part.

20 Claims, 8 Drawing Sheets

(56) References Cited

FOREIGN PATENT DOCUMENTS

| | | | |
|---|---|---|---|
| CN | 111584182 | A | 8/2020 |
| JP | 2012-204441 | A | 10/2012 |
| JP | 2014013815 | A | 1/2014 |
| JP | 2017-195321 | A | 10/2017 |
| JP | 2018-160611 | A | 10/2018 |
| JP | 2018-170321 | A | 11/2018 |
| JP | 2019-075478 | A | 5/2019 |
| JP | 2020-136390 | A | 8/2020 |

* cited by examiner

INDUCTOR COMPONENT

CROSS REFERENCE TO RELATED APPLICATION

This application claims benefit of priority to Japanese Patent Application 2019-095376 filed May 21, 2019, the entire content of which is incorporated herein by reference.

BACKGROUND

Technical Field

The present disclosure relates to an inductor component.

Background Art

A conventional inductor component is described in Japanese Laid-Open Patent Publication No. 2014-13815. This inductor component includes a substrate, spiral wirings disposed on both surfaces of the substrate, a magnetic layer covering the spiral wirings, external terminals disposed on a surface of the magnetic layer, and a lead-out wiring electrically connecting the spiral wirings and the external terminals.

SUMMARY

Inductor components are recently increasingly miniaturized, and areas of external terminals are reduced. When the conventional inductor components are mounted on substrates by using mounting solder such as solder balls or solder paste, the areas of the external terminals made smaller due to further miniaturization etc. may make it difficult to dispose the mounting solder accurately with respect to the external terminals, i.e., to achieve stable mounting so that the mounting solder and the external terminals are favorably connected.

Therefore, the present disclosure provides an inductor component facilitating stable mounting.

An aspect of the present disclosure provides an inductor component comprising a main body part including a magnetic layer containing a resin and a metal magnetic powder contained in the resin; an inductor wiring disposed in the main body part; an external terminal exposed from the main body part; and a lead-out wiring electrically connecting the inductor wiring and the external terminal. Also, an outer surface of the external terminal includes a concave part.

The inductor wiring gives an inductance to the inductor component by generating a magnetic flux in a magnetic layer when a current is applied, and is not particularly limited in terms of structure, shape, material, etc.

According to the inductor component of the present disclosure, since the outer surface of the external terminal includes the concave part, when the inductor component is mounted, mounting solder such as a solder ball or solder paste flows into the concave part and is thereby self-aligned, which facilitates stable mounting.

In an embodiment of the inductor component, the external terminal includes an overlapping portion located on the lead-out wiring and a non-overlapping portion located on the magnetic layer, and the concave part is located on an outer surface of the overlapping portion.

According to the embodiment, since the mounting solder is self-aligned with the overlapping portion located on the lead-out wiring, a current path is shortened, and electric resistance is reduced.

In an embodiment of the inductor component, the lead-out wiring is a vertical wiring penetrating the magnetic layer in a direction orthogonal to a principal surface of the magnetic layer.

According to the embodiment, by using the principal surface of the magnetic layer as a mounting surface, a current path can linearly be formed from the mounting surface to the inductor wiring, which reduces electric resistance.

In an embodiment of the inductor component, the external terminal includes a plurality of conductor layers.

According to the embodiment, the conductor layers can have different functions. For example, a first conductor layer can be made of Cu as a conductive layer and a planarization layer, a second conductor layer can be made of Ni as a solder-resistant layer, and a third conductor layer can be made of Au or Sn as a corrosion prevention layer and a solder-philic layer.

In an embodiment of the inductor component, an outermost layer of the external terminal contains Au or Sn.

According to the embodiment, the outermost layer of the external terminal can be a favorable corrosion prevention and solder-philic layer.

In an embodiment of the inductor component, a lowermost layer of the external terminal contains Cu.

According to the embodiment, the lowermost layer can be a favorable conductive and planarization layer.

In an embodiment of the inductor component, the lowermost layer contains 95 wt % or more Cu and 1 wt % or more and 5 wt % or less (i.e., from 1 wt % to 5 wt %) Ni.

According to the embodiment, a stress in the lowermost layer due to Ni can be released, and a damage to the inductor component due to accumulation of stress such as heat and external force can be reduced. Since an amount of Ni is small, a reduction in electric conductivity can be suppressed in the lowermost layer.

In an embodiment of the inductor component, the lowermost layer of the external terminal is made of Ni or contains Ni.

According to the embodiment, the lowermost layer can serve as a favorable solder-resistant layer to suppress erosion inside the main body part by solder.

In an embodiment of the inductor component, the external terminal includes a crack.

According to the embodiment, the stress in the external terminal is released, and a damage to the inductor component due to accumulation of stress such as heat and external force can be reduced.

In an embodiment of the inductor component, the depth of the concave part is 5% or more and less than 100% (i.e., from 5% to less than 100%) relative to the thickness of the external terminal other than the concave part.

According to the embodiment, since the depth of the concave part is 5% or more, the self-alignment property of the mounting solder is further improved. Since the depth of the concave part is less than 100%, accumulation of stress due to a level difference of the concave part is reduced.

In an embodiment of the inductor component, the depth of the recess is 0.5 μm or more and less than 10 μm (i.e., from 0.5 μm to 10 μm).

According to the embodiment, since the depth of the concave part is 0.5 μm or more, the self-alignment property of the mounting solder is further improved. Since the depth of the concave part is less than 10 μm, accumulation of stress due to a level difference of the concave part is reduced.

In an embodiment of the inductor component, an arithmetic average roughness of an outer surface of the overlapping portion is smaller than an arithmetic average roughness of an outer surface of the non-overlapping portion.

According to the embodiment, the overlapping portion can be distinguished from the non-overlapping portion in the external terminal, so that the connection between the external terminal and the vertical wiring can easily be confirmed.

In an embodiment of the inductor component, the lead-out wiring extends onto the magnetic layer.

According to the embodiment, a contact area between the lead-out wiring and the magnetic layer increases, which can improve adhesion between the magnetic layer and the lead-out wiring.

In an embodiment of the inductor component, a surface of the lead-out wiring includes a concave groove, and the concave part is located at a position corresponding to the concave groove.

According to the embodiment, since the mounting solder is self-aligned with the overlapping portion located on the lead-out wiring, the current path is shortened, and the electric resistance is reduced.

In an embodiment of the inductor component, based on a surface of the magnetic layer, the surface of the lead-out wiring is within a range of +5 μm to −10 μm in a direction perpendicular to the surface.

According to the embodiment, since the surface of the lead-out wiring is within a certain range based on the surface of the magnetic layer, accumulation of stress due to a level difference between the surface of the lead-out wiring and the surface of the magnetic layer is reduced.

In an embodiment of the inductor component, the inductor component further includes a coating film disposed on the surface of the magnetic layer, and the coating film is in contact with an outer circumferential edge of the external terminal.

According to the embodiment, since the coating film is disposed around external terminals, the insulation can be enhanced between the external terminals.

In an embodiment of the inductor component, the external terminal is also disposed on the coating film.

According to the embodiment, the area of the external terminal can be increased, so that stable mountability can be provided and mechanical strength can be improved.

In an embodiment of the inductor component, the coating film is also disposed on the surface of the lead-out wiring, and the coating film on the lead-out wiring and the coating film on the magnetic layer have different reflection spectra when light of a predetermined wavelength is applied from the outer surface side.

According to the embodiment, the position of the lead-out wiring can be confirmed from appearance. Therefore, the connectivity between the external terminal and the lead-out wiring can easily be confirmed. The phrase "having different reflection spectra when light of a predetermined wavelength is applied" means that the reflection spectra of the light of a predetermined wavelength incident from the outer surface side of a laminated body or the external terminal have a difference identifiable visually or by a device in terms of at least one of brightness, saturation, and hue. Specifically, for example, when any light of a predetermined wavelength among infrared light, visible light, ultraviolet light, etc. is applied, and a difference can be identified as described above, the reflection spectra can be considered to be different.

In an embodiment of the inductor component, the magnetic layer further contains a ferrite powder.

According to the embodiment, containing the ferrite powder having a high relative magnetic permeability can improve an effective magnetic permeability, i.e., a magnetic permeability per volume of the magnetic layer.

According to the inductor component of an aspect of the present disclosure, the stable mounting is facilitated.

DETAILED DESCRIPTION

An inductor component of an aspect of the present disclosure will now be described in detail with reference to shown embodiments. The drawings include schematics and may not reflect actual dimensions or ratios.

First Embodiment (Configuration)

Figure 1A:
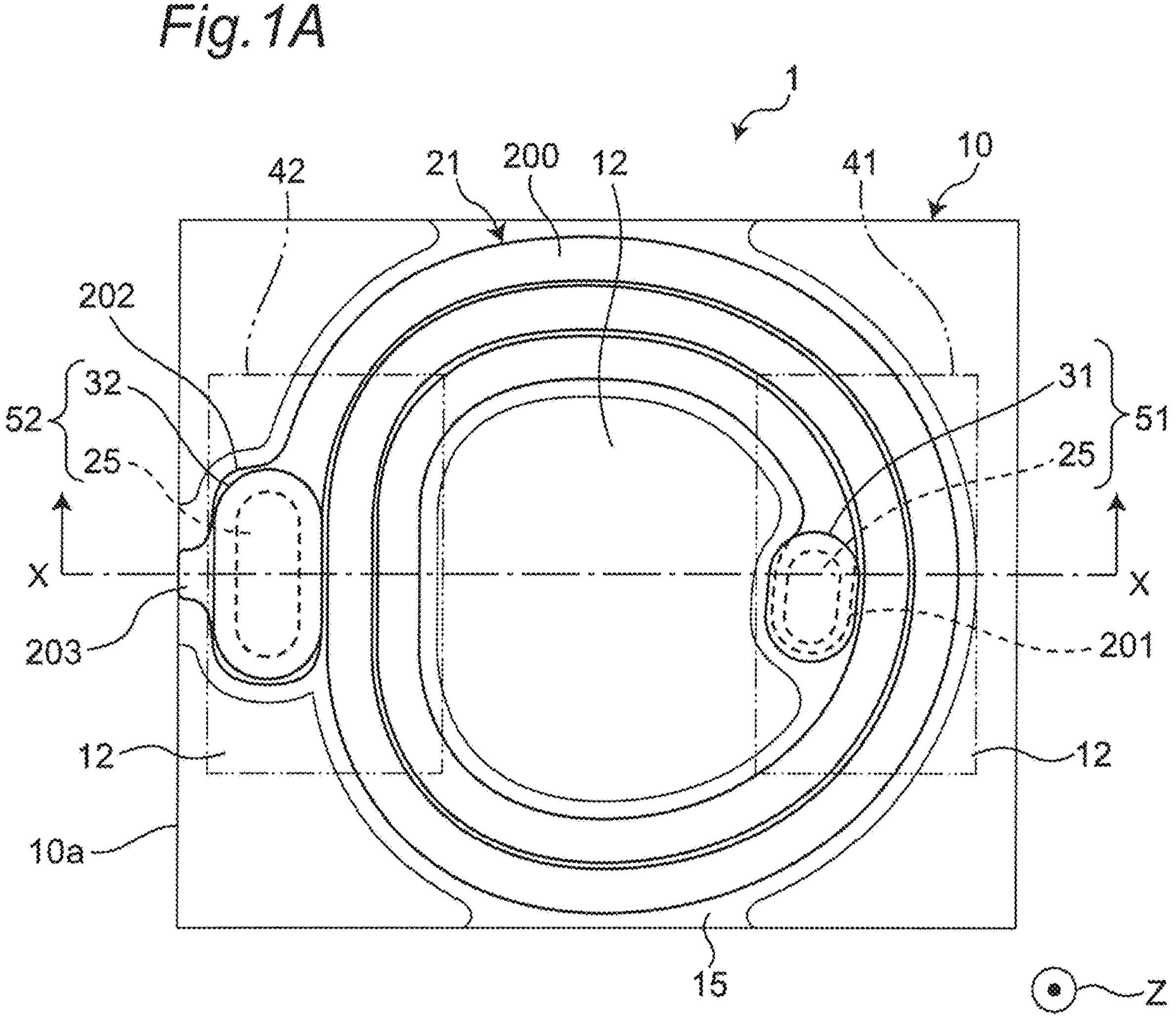
FIG. 1A is a transparent plan view showing an inductor component according to a first embodiment.
Figure 1B:
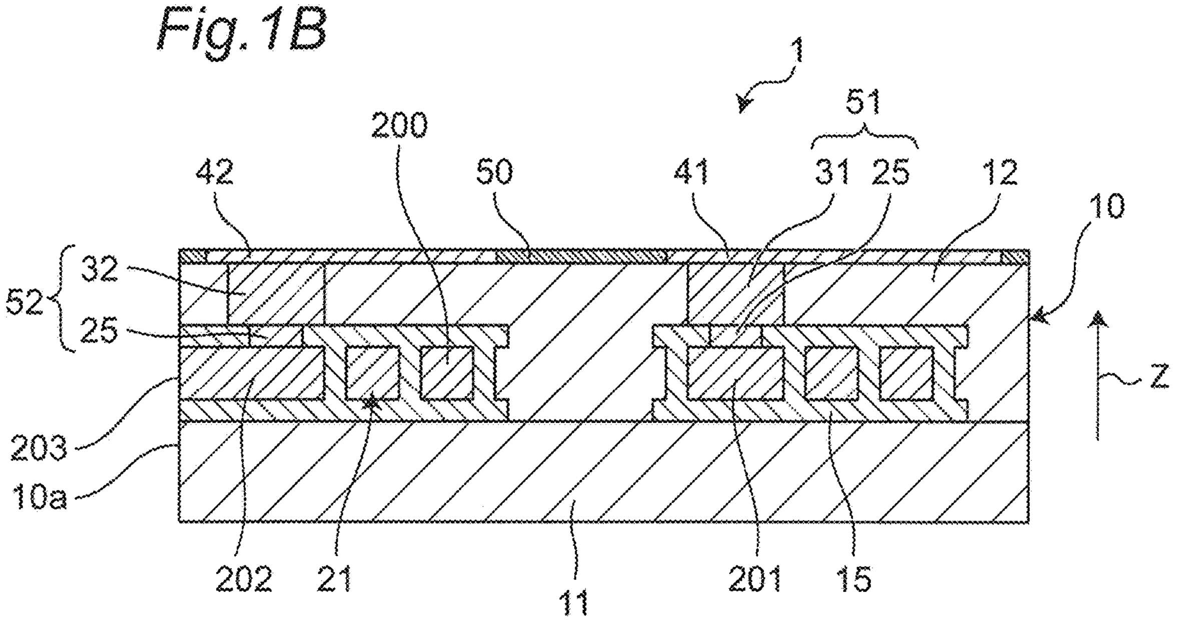
FIG. 1B is a cross-sectional view showing the inductor component according to the first embodiment.

FIG. 1A is a perspective plan view showing a first embodiment of an inductor component. FIG. 1B is a cross-sectional view taken along a line X-X of FIG. 1A.

An inductor component 1 is mounted on an electronic device such as a personal computer, a DVD player, a digital camera, a TV, a portable telephone, a smartphone, and automotive electronics, for example, and is a component generally having a rectangular parallelepiped shape, for example. However, the shape of the inductor component 1 is not particularly limited and may be a circular columnar shape, a polygonal columnar shape, a truncated cone shape, or a truncated polygonal pyramid shape.

As shown in FIGS. 1A and 1B, the inductor component 1 includes a main body part 10, an inductor wiring 21, vertical wirings 51, 52 as an example of a lead-out wiring, and external terminals 41, 42.

The main body part 10 includes a first magnetic layer 11, a second magnetic layer 12 disposed on the first magnetic layer 11, an insulating layer 15, and an insulating coating film 50. The first magnetic layer 11 and the second magnetic layer 12 are laminated in a first direction Z and have principal surfaces orthogonal to the first direction Z. The main body part 10 includes the first magnetic layer 11 and the second magnetic layer 12 as two magnetic layers; however, the number of magnetic layers may be three or more, or only one magnetic layer may be included. In the figures, it is assumed that a forward direction and a reverse direction of the first direction Z face upward and downward, respectively.

The first magnetic layer 11 and the second magnetic layer 12 contain a resin and a metal magnetic powder contained in the resin. Therefore, high magnetic saturation characteristics can be obtained from the metal magnetic powder, and the resin insulates particles of the metal magnetic powder, so that an iron loss is reduced at high frequency.

The resin includes any of epoxy, polyimide, phenol, and vinyl ether resins, for example. This improves the insulation reliability. More specifically, the resin is epoxy, or a mixture of epoxy and acrylic, or a mixture of epoxy, acrylic, and another resin. As a result, the insulation among particles of the metal magnetic powder is ensured, so that the iron loss can be made smaller at high frequency.

The metal magnetic powder has an average particle diameter of 0.1 μm or more and 5 μm or less (i.e., from 0.1 μm to 5 μm), for example. In a manufacturing stage of the inductor component 1, the average particle diameter of the metal magnetic powder can be calculated as a particle diameter corresponding to 50% of an integrated value in particle size distribution obtained by a laser diffraction/scattering method. The metal magnetic powder is made of, for example, an FeSi alloy such as FeSiCr, an FeCo alloy, an Fe alloy such as NiFe, or an amorphous alloy thereof. The content percentage of the metal magnetic powder is, preferably, 20 vol % or more and 70 vol % or less (i.e., from 20 vol % to 70 vol %) relative to the whole magnetic layer. When the average particle diameter of the metal magnetic powder is 5 μm or less, higher magnetic saturation characteristics can be obtained, and the iron loss at high frequency can be reduced by fine powder. Instead of the metal magnetic powder, magnetic powder of NiZn- or MnZn-based ferrite may be used. Containing the ferrite powder having a high relative magnetic permeability as described above can improve an effective magnetic permeability, i.e., a magnetic permeability per volume of the first and second magnetic layers 11, 12.

The inductor wiring 21 is disposed in the main body part 10. The inductor wiring 21 is formed only on the upper side of the first magnetic layer 11, or specifically, on the insulating layer 15 on an upper surface of the first magnetic layer 11 and is a wiring extending in a spiral shape along the upper surface of the first magnetic layer 11 in this embodiment. The number of turns of the inductor wiring 21 exceeds one and is about 2.5. The inductor wiring 21 is spirally wound in a clockwise direction from an outer circumferential end toward an inner circumferential end when viewed from the upper side, for example.

In the above description, the spiral shape means a curve (two-dimensional curve) extending on a plane, and the number of turns drawn by the curve may be more than one or less than one. The spiral shape may have a curve wound in a different direction or may have a portion that is a straight line.

The thickness of the inductor wiring 21 is preferably 40 μm or more and 120 μm or less (i.e., from 40 μm to 120 μm), for example. An example of the inductor wiring 21 has a thickness of 45 μm, a wiring width of 50 μm, and an inter-wiring space of 10 μm. The inter-wiring space is preferably 3 μm or more and 20 μm or less (i.e., from 3 μm to 20 μm). The thickness of the inductor wiring 21 refers to the maximum dimension along the first direction Z in a cross section orthogonal to the extending direction of the inductor wiring 21.

The inductor wiring 21 is made of a conductive material and is made of a metal material having a low electric resistance such as Cu, Ag, Au, Fe, or a compound thereof, for example. As a result, the electric conductivity can be reduced, and the DC resistance can be reduced. In this embodiment, the inductor component 1 includes only one layer of the inductor wiring 21, so that the inductor component 1 can be reduced in height. Multiple layers of the inductor wiring 21 may be included, and the multiple layers of the inductor wiring 21 may electrically be connected in series by via wirings. Therefore, a winding shape (helical shape) may be formed by the multiple layers of the inductor wiring 21 and the via wirings. The winding shape may be a helical shape advancing parallel to the first direction Z or may be a helical shape advancing in a direction perpendicular to the first direction Z.

The inductor wiring 21 includes a spiral part 200, pad parts 201, 202, and a lead-out part 203 arranged on a plane orthogonal to the first direction Z (in a direction parallel to the principal surface of the first magnetic layer 11) and connected to each other. Therefore, the inductor wiring 21 extends on a plane. The first pad part 201 is disposed at an inner circumferential end of the spiral part 200, and the second pad part 202 is disposed at an outer circumferential end of the spiral part 200. The spiral part 200 is spirally wound between the first pad part 201 and the second pad part 202. The first pad part 201 is connected to the first vertical wiring 51, and the second pad part 202 is connected to the second vertical wiring 52. The lead-out part 203 is led out from the second pad part 202 to a first side surface **10*a* of the main body part 10 parallel to the first direction Z and is exposed to the outside from the first side surface 10*a* of the main body part 10**.

The insulating layer 15 is a film-shaped layer formed on the upper surface of the first magnetic layer 11 and covers the inductor wiring 21. Since the inductor wiring 21 is covered with the insulating layer 15, insulation reliability can be improved. Specifically, the insulating layer 15 entirely covers the bottom and side surfaces of the inductor wiring 21 and covers a portion of the upper surface of the inductor wiring 21 except connection portions of the pad parts 201, 202 for via wirings 25. The insulating layer 15 has holes at positions corresponding to the pad parts 201, 202 of the inductor wiring 21. The holes can be formed by photolithography or laser opening, for example. The thickness of the insulating layer 15 between the first magnetic layer 11 and the bottom surface of the inductor wiring 21 is 10 μm or less, for example.

The insulating layer 15 is made of a nonmagnetic insulating material containing no magnetic substance and is made of, for example, a resin material such as an epoxy resin, a phenol resin, a polyimide resin. The insulating layer 15 may contain a filler of a nonmagnetic substance such as silica and, in this case, the insulating layer 15 can be improved in the strength, workability, and electrical characteristics. The insulating layer 15 is not an essential constituent element, and the inductor wiring 21 may be in direct contact with the first magnetic layer 11 and the second magnetic layer 12. The insulating layer 15 may only partially cover the bottom surface, the side surfaces, the upper surface, etc. of the inductor wiring 21.

The vertical wirings 51, 52 are made of a conductive material, extend in the first direction Z from the pad parts 201, 202 of the inductor wiring 21 to penetrate the inside of the second magnetic layer 12, and are connected to the inductor wiring 21 and the external terminals 41, 42. Since the vertical wirings 51, 52 penetrate the second magnetic layer 12, unnecessary routing can be avoided for connecting the external terminals 41, 42 to the inductor wiring 21. Specifically, by using the principal surface of the second magnetic layer 12 as a mounting surface, a current path can linearly be formed from the mounting surface to the inductor wiring 21, which reduces electric resistance. The vertical wirings 51, 52 include the via conductors 25 extending from the pad parts 201, 202 of the inductor wiring 21 in the first direction Z and penetrating the inside of the insulating layer 15 and columnar wirings 31, 32 extending from the via conductors 25 in the first direction Z and penetrating the inside of the second magnetic layer 12. The columnar wirings 31, 32 are exposed from an upper surface of the second magnetic layer 12.

The first vertical wiring 51 includes the via conductor 25 extending upward from the upper surface of the first pad part 201 of the inductor wiring 21 and the first columnar wiring 31 extending upward from the via conductor 25 and penetrating the inside of the first magnetic layer 11. The second vertical wiring 52 includes the via conductor 25 extending upward from the upper surface of the second pad part 202 of the inductor wiring 21 and the second columnar wiring 31 extending upward from the via conductor 25 and penetrating the inside of the first magnetic layer 11. The vertical wirings 51, 52 are made of the same material as the inductor wiring 21.

The external terminals 41, 42 are made of a conductive material. The first external terminal 41 is disposed from on the first columnar wiring 31 onto the second magnetic layer 12 and is exposed from the upper surface of the main body part 10. As a result, the first external terminal 41 is electrically connected to the first pad part 201 of the inductor wiring 21. The second external terminal 42 is disposed from on the second columnar wiring 32 onto the second magnetic layer 12 and is exposed from the upper surface of the main body part 10. As a result, the second external terminal 42 is electrically connected to the second pad part 202 of the inductor wiring 21.

Preferably, the external terminals 41, 42 are made up of multiple conductor layers. As a result, the conductor layers can have different functions. For example, a first conductor can be made of Cu as a conductive layer and a planarization layer, a second conductor layer can be made of Ni as a solder-resistant layer, and a third conductor layer can be made of Au or Sn as a corrosion prevention layer and a solder-philic layer.

Preferably, outermost layers of the external terminals 41, 42 contain Au or Sn. As a result, the outermost layers of the external terminals 41, 42 can be favorable corrosion prevention and solder-philic layers.

Preferably, first conductor layers (lowermost layers) defined as first layers of the external terminals 41, 42 contain Cu. As a result, the first conductor layers can be favorable conductive and planarization layers. In other words, by using a material with low electric conductivity for the first conductor layers, DC resistance can be reduced.

Preferably, the first conductor layers contain 95 wt % or more Cu and 1 wt % or more and 5 wt % or less (i.e., from 1 wt % to 5 wt %) Ni. As a result, the stress in the lowermost layers due to Ni can be released, and a damage to the inductor component 1 due to accumulation of stress such as heat and external force can be reduced. Since an amount of Ni is small, a reduction in electric conductivity can be suppressed in the lowermost layers. The first conductor layers contain Ni and therefore can be formed by electroless plating of Cu.

Preferably, the first conductor layers of the external terminals 41, 42 are made of Ni or contain Ni. As a result, the first conductor layers can serve as favorable solder-resistant layers to suppress erosion inside the main body part 10 by solder. Specifically, an alloy layer of Ni is made of an NiP alloy containing 2 wt % to 10 wt % P, for example. In this case, a catalyst layer of Pd etc. exists between an underlayer (the magnetic layer and the columnar wiring) and the Ni layer. The catalyst layer is not a layer constituting the external terminals 41, 42.

The insulating coating film 50 is made of a nonmagnetic insulating material containing no magnetic substance and is disposed on the upper surface of the second magnetic layer 12 serving as an outer surface, exposing upper surfaces of the external terminals 41, 42. The insulation of the surface of the inductor component 1 can be ensured by the coating film 50. By disposing the coating film 50, the insulation can be enhanced between the first external terminal 41 and the second external terminal 42 to improve the reliability. The coating film 50 may be formed on the lower surface side of the first magnetic layer 11.

The insulating coating film 50 is in contact with outer circumferential edges of the external terminals 41, 42. Since the coating film 50 is disposed around the external terminals 41, 42 in this way, the insulation can be enhanced between the external terminals 41, 42. The external terminals 41, 42 are preferably disposed also on the surface of the coating film 50. As a result, the area of the external terminals 41, 42 can be increased, so that stable mountability can be provided and mechanical strength can be improved.

Figure 2:
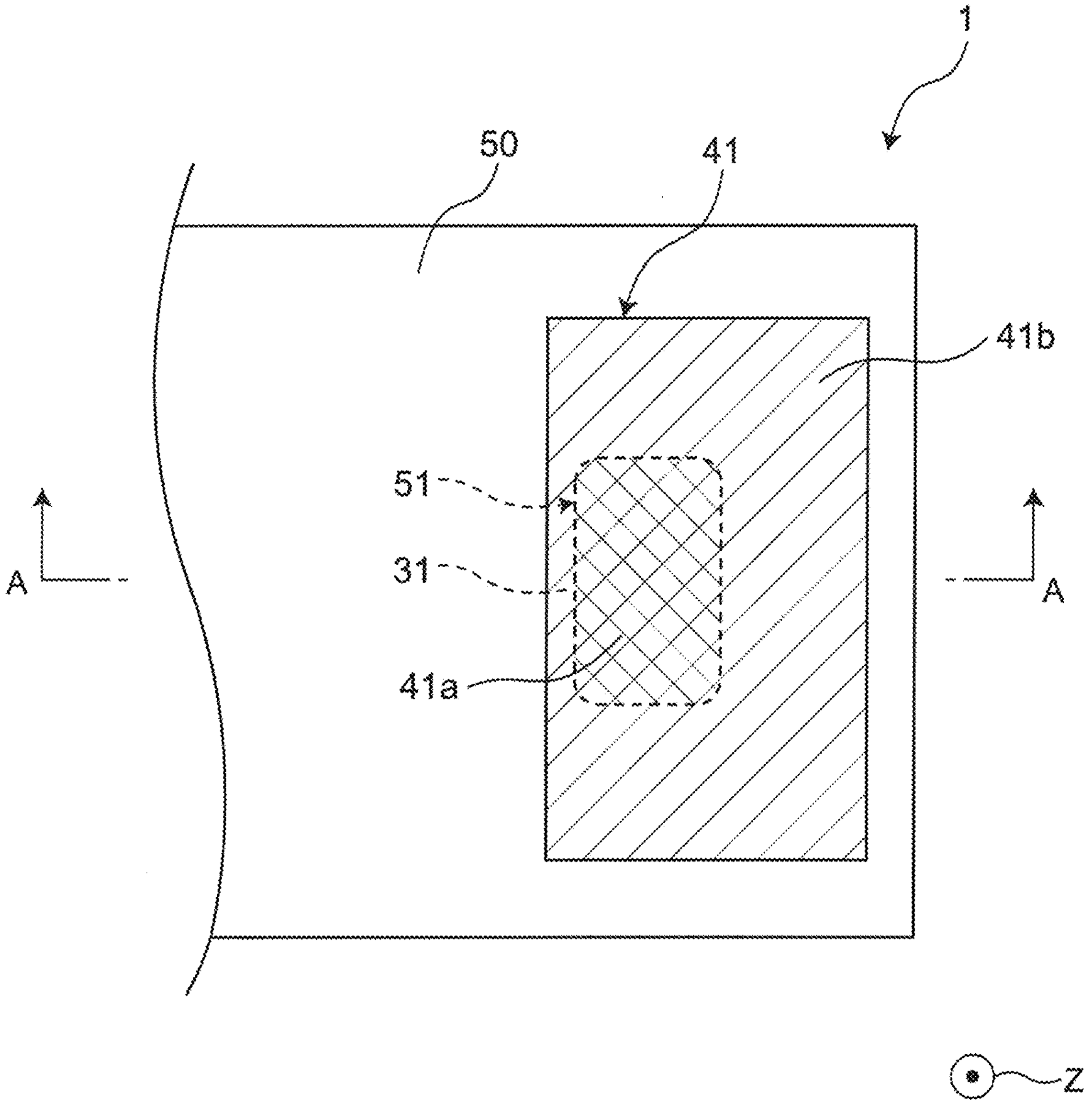
FIG. 2 is a simplified plan view showing a positional relationship between a first external terminal and a first vertical wiring.
Figure 3:
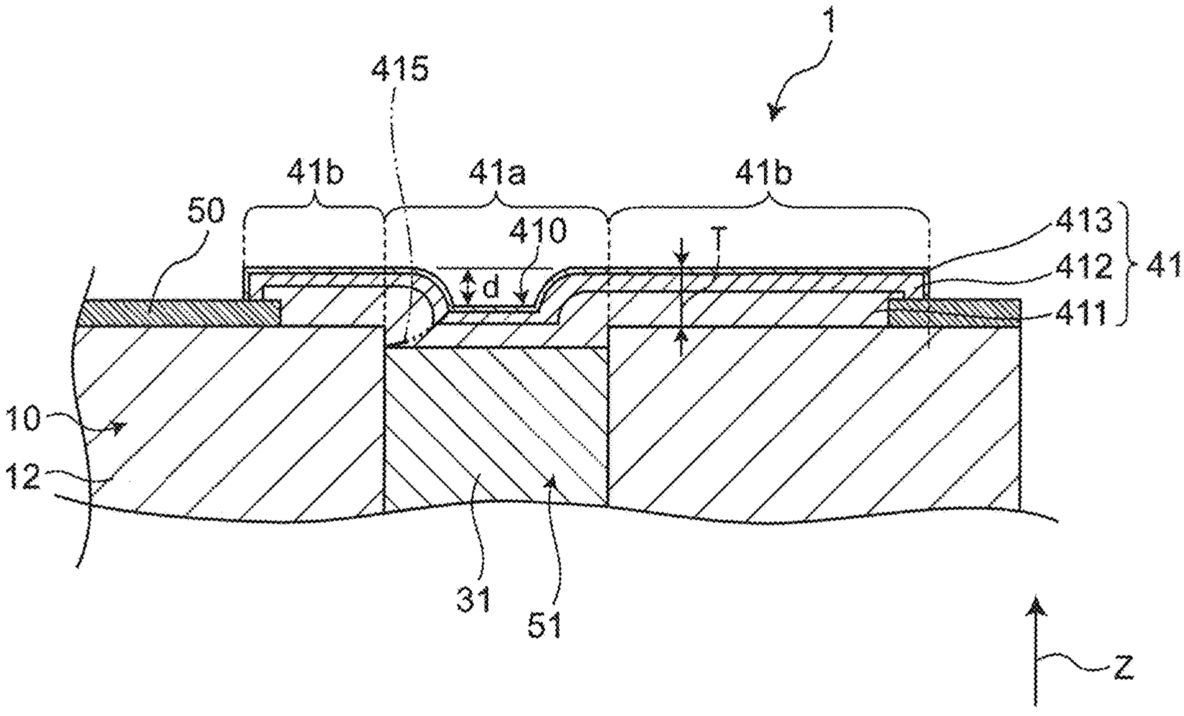
FIG. 3 is a cross-sectional view taken along a line A-A of FIG. 2.

FIG. 2 is a simplified plan view showing a positional relationship between the first external terminal 41 and the first vertical wiring 51 (lead-out wiring) as viewed in the first direction Z. FIG. 3 is a cross-sectional view taken along a line A-A of FIG. 2. The first external terminal 41 and the first vertical wiring 51 will hereinafter be described, and the second external terminal 42 and the second vertical wiring 52 have the same configuration and will not be described.

As shown in FIGS. 2 and 3, the first external terminal 41 includes an overlapping portion 41*a* located on the first vertical wiring 51 (the first columnar wiring 31) and a non-overlapping portion 41*b* located on the second magnetic layer 12 without overlapping with the first vertical wiring 51 (the first columnar wiring 31). In FIG. 2, the overlapping portion 41*a* is indicated by shaded hatching, and the non-overlapping portion 41*b* is indicated by normal hatching. The size of the first vertical wiring 51 is smaller than the size of the first external terminal 41, and the first vertical wiring 51 entirely overlaps with a portion of the first external terminal 41.

An outer surface (upper surface) of the first external terminal 41 has a concave part 410. The concave part 410 is located on an outer surface (upper surface) of the overlapping portion 41*a*. A bottom surface of the concave part 410 is at a position lower than an upper surface of the non-overlapping portion 41*b* of the first external terminal 41. The concave part 410 may be located on the upper surface of the non-overlapping portion 41*b*, and in this case, the bottom surface of the concave part 410 is at a position lower than the upper surface of the overlapping portion 41*a* of the first external terminal 41.

An example of a method of forming the concave part 410 will be described. By performing soft etching after the first columnar wiring 31 is formed in the main body part 10, the first columnar wiring 31 is etched, so that an upper surface of the first columnar wiring 31 becomes lower than the upper surface of the second magnetic layer 12. Subsequently, the first external terminal 41 is formed by electroless plating on the first columnar wiring 31 and the second magnetic layer 12, so that the portion of the first external terminal 41 on the first columnar wiring 31 is formed at a position lower than the portion of the first external terminal 41 on the second magnetic layer 12. In this way, the concave part 410 is formed in the overlapping portion 41*a* of the first external terminal 41 on the first columnar wiring 31. By controlling the etching time, a depth d of the concave part 410 can be controlled. By etching the resin of the second magnetic layer 12 an alkaline etchant etc. instead of etching the first columnar wiring 31, the upper surface of the first columnar wiring 31 becomes higher than the upper surface of the second magnetic layer 12, so that the concave part 410 can be formed on the upper surface of the non-overlapping portion 41*b*.

Therefore, since the outer surface of the first external terminal 41 has the concave part 410, when the inductor component 1 is mounted, mounting solder such as a solder ball or solder paste flows into the concave part 410 and is thereby self-aligned, which facilitates stable mounting. Since the mounting solder is self-aligned with the overlapping portion 41*a*, the current path is shortened, and the electric resistance is reduced.

Preferably, the first external terminal 41 has a crack 415 indicated by an imaginary line of FIG. 3. The crack 415 is formed from the bottom surface of the concave part 410 toward the first columnar wiring 31. As a result, the stress in the first external terminal 41 is released, and a damage to the inductor component 1 due to accumulation of stress such as heat and external force can be reduced.

Preferably, the depth d of the concave part 410 is 5% or more and less than 100% (i.e., from 5% to less than 100%) relative to a thickness T of the first external terminal 41 other than the concave part 410. As a result, since the depth d of the concave part 410 is 5% or more, the self-alignment property of the mounting solder is further improved. Since the depth d of the concave part 410 is less than 100%, accumulation of stress due to a level difference of the concave part 410 is reduced.

The thickness T of the first external terminal 41 is the thickness of the portion (the non-overlapping portion 41*b*) of the first external terminal 41 in contact with the main body part 10 and is, for example, the thickness of a central part in a cross-sectional width direction of the non-overlapping portion 41*b* of the first external terminal 41. When the first external terminal 41 is made up of a first conductor layer 411 made of electroless-plated Cu, a second conductor layer 412 made of electrolytic-plated Cu, and a third conductor layer 413 made of electroless-plated Au, and the first columnar wiring 31 is made of electrolytic-plating Cu, an interface between the first conductor layer 411 and the first columnar wiring 31 is hardly identified. This makes it difficult to measure the thickness in the portion (the overlapping portion 41*a*) of the first external terminal 41 in contact with the first columnar wiring 31. Therefore, the thickness of the first external terminal 41 can easily be measured by measuring the thickness in the portion (the non-overlapping portion 41*b*) of the first external terminal 41 in contact with the main body part 10.

Preferably, the depth d of the concave part 410 is 0.5 μm or more and less than 10 μm (i.e., from 0.5 μm to 10 μm). As a result, since the depth d of the concave part 410 is 0.5 μm or more, the self-alignment property of the mounting solder is further improved. Since the depth d of the concave part 410 is less than 10 μm, accumulation of stress due to a level difference of the concave part 410 is reduced.

Preferably, an arithmetic average roughness of the outer surface of the overlapping portion 41*a* is smaller than an arithmetic average roughness of the outer surface of the non-overlapping portion 41*b*. As a result, the overlapping portion 41*a* can be distinguished from the non-overlapping portion 41*b*, so that the connection between the first external terminal 41 and the first vertical wiring 51 can easily be confirmed. For example, a surface roughness Ra of the non-overlapping portion 41*b* is not less than 1.5 times and not more than 2.5 times (i.e., from 1.5 times to 2.5 times) a surface roughness Ra of the overlapping portion 41*a*.

The surface roughness Ra of the overlapping portion 41*a* is different from the surface roughness Ra of the non-overlapping portion 41*b* as described above since the overlapping portion 41*a* is formed on the upper surface of the first vertical wiring 51 while the non-overlapping portion 41*b* is formed on the upper surface of the second magnetic layer 12. Specifically, since the first vertical wiring 51 is made of metal, the upper surface of the first vertical wiring 51 becomes smooth. On the other hand, since the second magnetic layer 12 is made of a composite material containing a resin and a metal magnetic powder, the upper surface of the second magnetic layer 12 becomes rough. Since the overlapping portion 41*a* is formed on the upper surface of the first vertical wiring 51, the shape of the upper surface of the first vertical wiring 51 is transferred to the overlapping portion 41*a*. On the other hand, since the non-overlapping portion 41*b* is formed on the upper surface of the second magnetic layer 12, the shape of the upper surface of the second magnetic layer 12 is transferred to the non-overlapping portion 41*b*. Therefore, the surface of the non-overlapping portion 41*b* is rougher than the surface of the overlapping portion 41*a*. Since the surface of the non-overlapping portion 41*b* is rougher than the surface of the overlapping portion 41*a*, the overlapping portion 41*a* and the non-overlapping portion 41*b* have different reflection spectra when light of a predetermined wavelength (e.g., white light) is applied from the outer surface side.

Preferably, based on the surface of the second magnetic layer 12, the surface of the first columnar wiring 31 (lead-out wiring) is within a range of +5 μm to −10 μm in a direction perpendicular to the surface. The positive direction is assumed as the forward direction of the first direction Z. In the negative range, the upper surface of the first columnar wiring 31 is lower than the upper surface of the second magnetic layer 12, and the concave part 410 is formed on the upper surface of the overlapping portion 41*a*. In the positive range, the upper surface of the first columnar wiring 31 is higher than the upper surface of the second magnetic layer 12, and the concave part 410 is formed on the upper surface of the non-overlapping portion 41*b*. As a result, since the surface of the first columnar wiring 31 is within a certain range based on the surface of the second magnetic layer 12, accumulation of stress due to a level difference between the surface of the first columnar wiring 31 and the surface of the second magnetic layer 12 is reduced.

Second Embodiment

Figure 4:
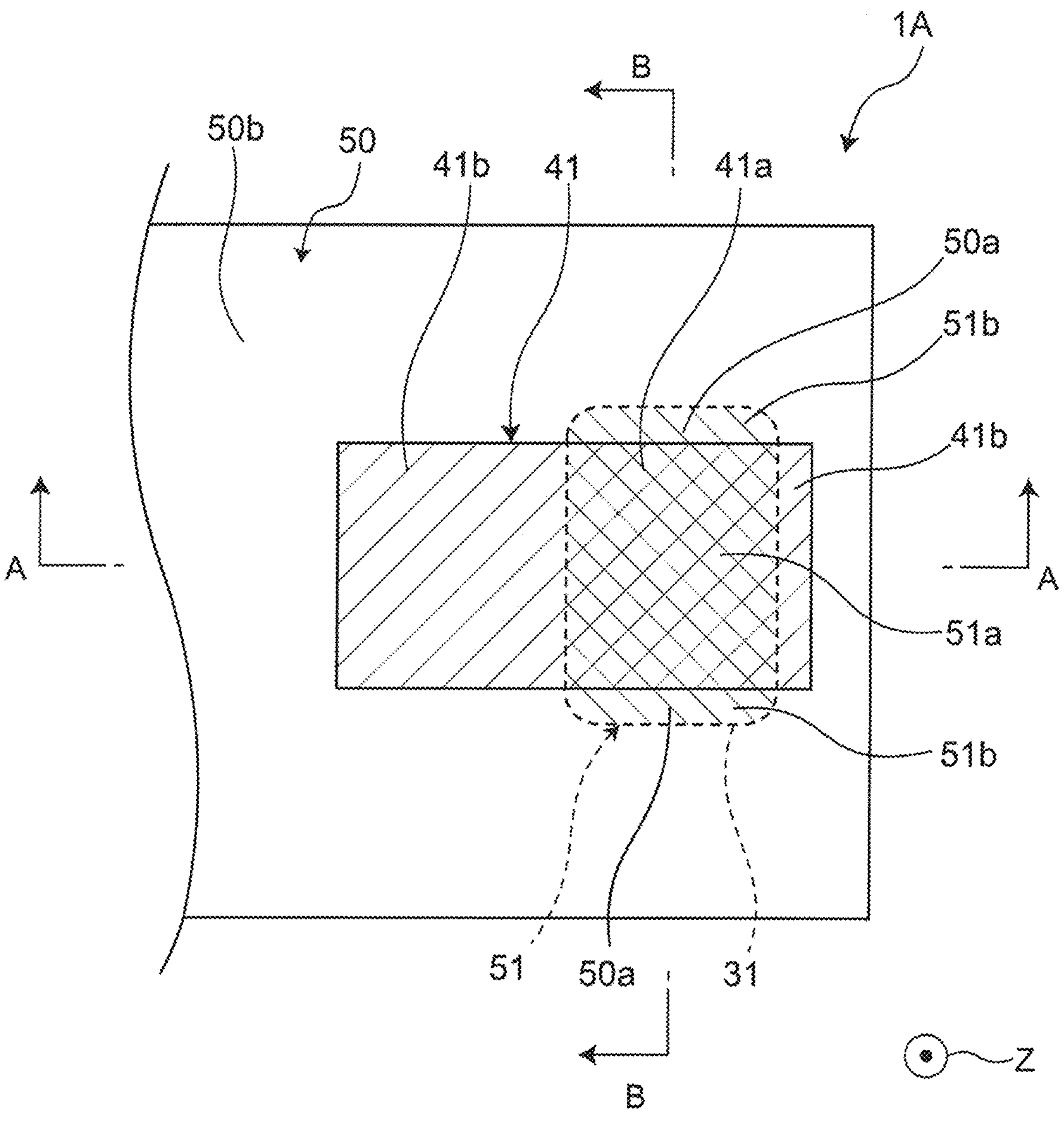
FIG. 4 is a simplified plan view showing a positional relationship between a first external terminal and a first vertical wiring in an inductor component according to a second embodiment.
Figure 5A:
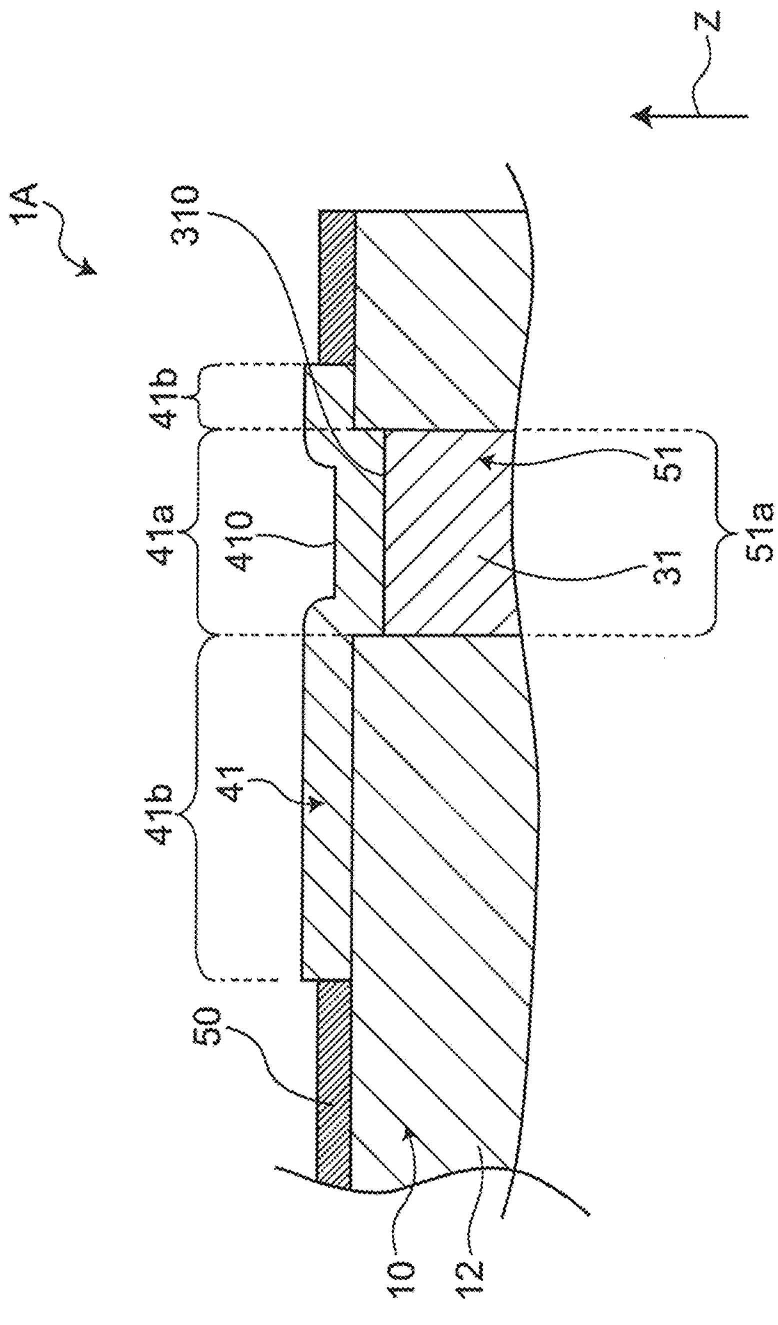
FIG. 5A is a cross-sectional view taken along a line A-A of FIG. 4.
Figure 5B:
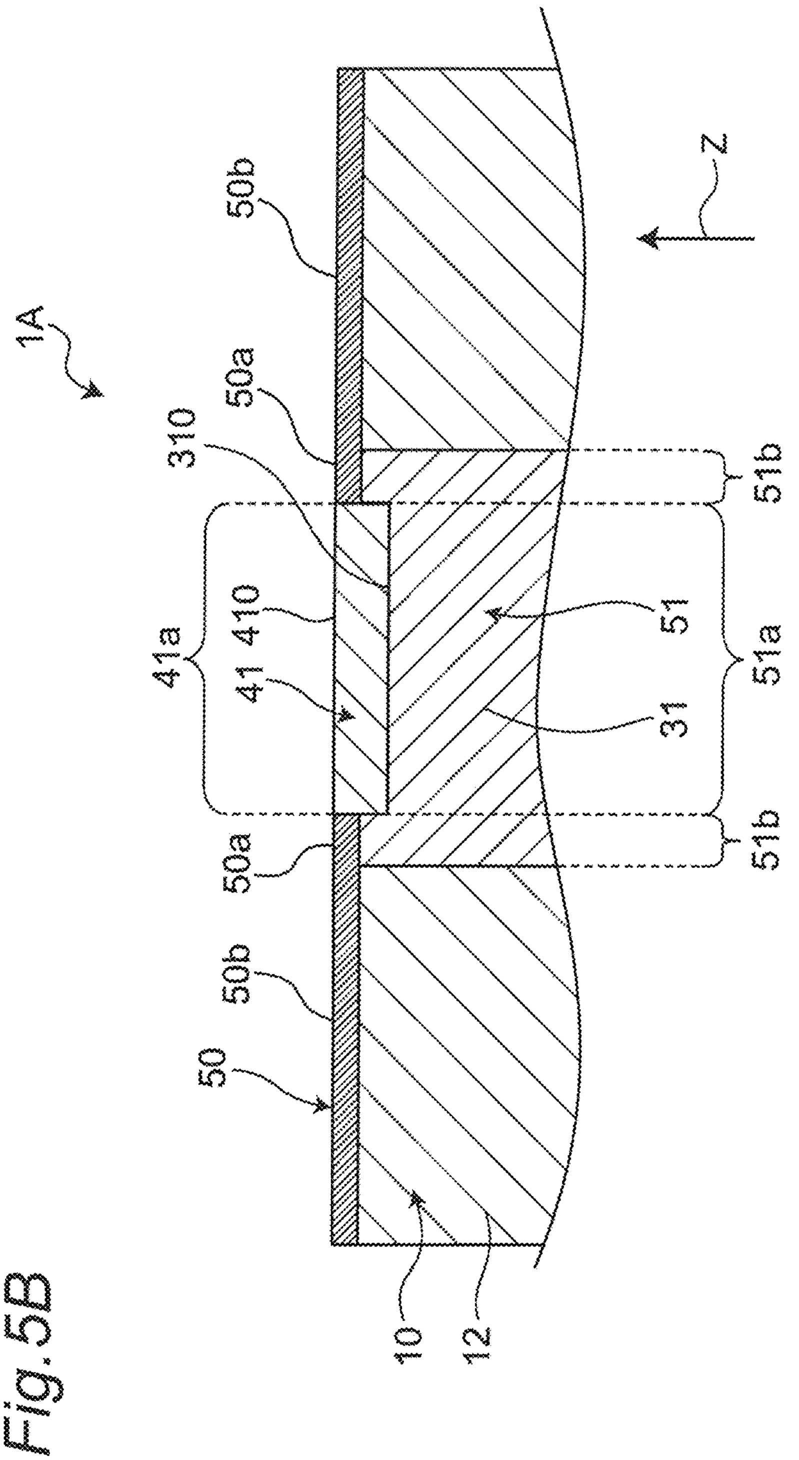
FIG. 5B is a cross-sectional view taken along a line B-B of FIG. 4.

FIG. 4 is a simplified plan view showing a second embodiment of the inductor component. FIG. 5A is a cross-sectional view taken along a line A-A of FIG. 4. FIG. 5B is a cross-sectional view taken along a line B-B of FIG. 4. The second embodiment is different from the first embodiment in the positions and sizes of the external terminals and the vertical wirings (lead-out wirings). The first external terminal 41 and the first vertical wiring 51 will hereinafter be described, and the second external terminal 42 and the second vertical wiring 52 have the same configuration and will not be described.

As shown in FIGS. 4, 5A, and 5B, in an inductor component 1A of the second embodiment, a portion of the first external terminal 41 overlaps with a portion of the first vertical wiring 51 (the first columnar wiring 31) when viewed in the first direction Z. The first external terminal 41 has the overlapping portion 41*a* located on the first vertical wiring 51 and the non-overlapping portion 41*b* located on the second magnetic layer 12 without overlapping with the first vertical wiring 51. The first vertical wiring 51 has an overlapping portion 51*a* overlapping with the first external terminal 41 and a non-overlapping portion 51*b* overlapping with the coating film 50 without overlapping with the first external terminal 41. The overlapping portions 41*a*, 51*a* are indicated by shaded hatching, and the non-overlapping portions 51*b*, 51*b* are indicated by normal hatching.

The surface of the first vertical wiring 51 has a concave groove 310, and the concave part 410 of the first external terminal 41 is located at a position corresponding to the concave groove 310. As a result, since the mounting solder is self-aligned with the overlapping portion 41*a* of the first external terminal 41, the current path is shortened, and the electric resistance is reduced.

The concave groove 310 is located in the overlapping portion 51*a* of the first vertical wiring 51. This is because, when the coating film 50 is disposed on the main body part 10 and etched, a portion of the first vertical wiring 51 covered with the coating film 50 is not etched, while a portion of the first vertical wiring 51 not covered with the coating film 50 is etched, so that the concave groove 310 is formed in the overlapping portion 51*a* of the first vertical wiring 51.

The coating film 50 is also disposed on the surface of the first vertical wiring 51, and the coating film 50 (a first portion 50*a*) on the first vertical wiring 51 and the coating film 50 (a second portion 50*b*) on the second magnetic layer 12 have different reflection spectra when light of a predetermined wavelength (e.g., white light) is applied from the outer surface side.

This is because, as described in the first embodiment, the upper surface of the first vertical wiring 51 becomes smooth and the upper surface of the second magnetic layer 12 becomes rough. Since the first portion 50*a* is formed on the upper surface of the first vertical wiring 51, the shape of the upper surface of the first vertical wiring 51 is transferred to the first portion 50*a*. On the other hand, since the second portion 50*b* is formed on the upper surface of the second magnetic layer 12, the shape of the upper surface of the second magnetic layer 12 is transferred to the second portion 50*b*. Therefore, the surface of the second portion 50*b* is rougher than the surface of the first portion 50*a*. Since the surface of the second portion 50*b* is rougher than the surface of the first portion 50*a*, at least one of brightness, saturation, and hue of the first portion 50*a* and the second portion 50*b* can easily be changed.

Therefore, the position of the first vertical wiring 51 can be confirmed from appearance, and the connectivity between the first external terminal 41 and the first vertical wiring 51 can easily be confirmed.

Figure 6:
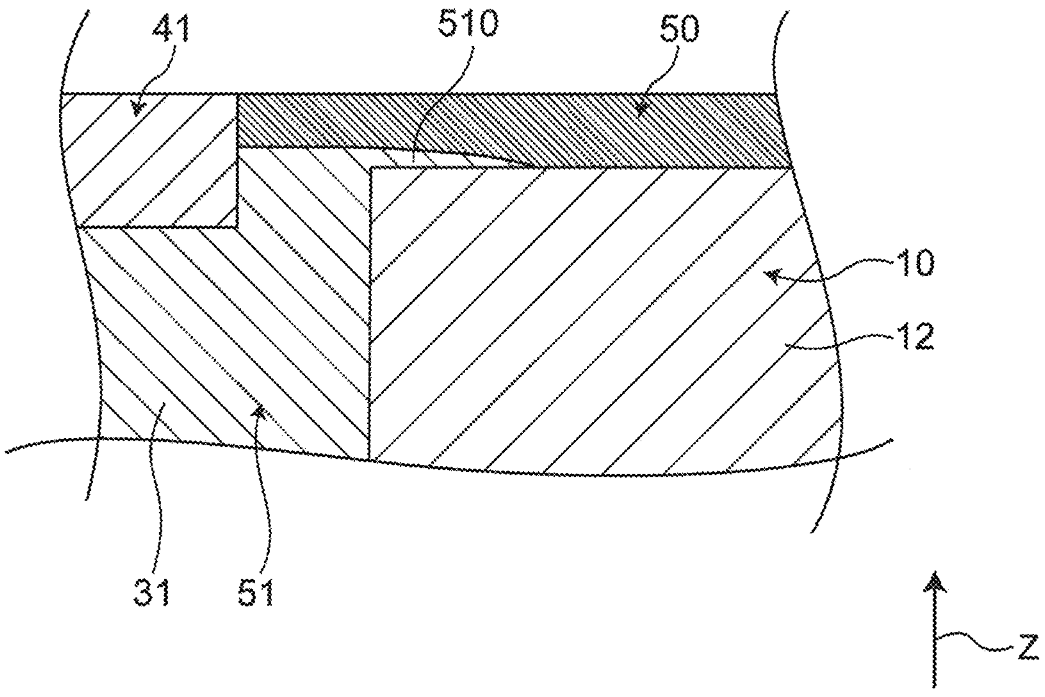
FIG. 6 is a cross-sectional view showing another form of the first vertical wiring.

As shown in FIG. 6, the first vertical wiring 51 may extend onto the second magnetic layer 12. The first vertical wiring 51 has an extending part 510 located on the second magnetic layer 12. For example, the extending part 510 can be formed by grinding the upper surface of the first vertical wiring 51. As a result, a contact area between the first vertical wiring 51 and the second magnetic layer 12 increases, which can improve adhesion between the first vertical wiring 51 and the second magnetic layer 12.

The present disclosure is not limited to the embodiments described above and may be changed in design without departing from the spirit of the present disclosure. For example, respective feature points of the first and second embodiments may variously be combined.

In the embodiments, the inductor wiring 21 has a spiral shape; however, as described above, the shape of the inductor wiring 21 is not limited, and various known shapes are usable.

In the embodiment, the first external terminal and the second external terminal have the features of the respective embodiments; however, at least the first external terminal may have the features between the first external terminal and the second external terminal.

In the embodiments, the vertical wiring including the via conductor and the columnar wiring is used as the lead-out wiring; however, the vertical wiring including only the columnar wiring may be used as the lead-out wiring in a configuration in which the insulating layer is removed. In the embodiments, the vertical wiring extending in the first direction is used for the lead-out wiring uses; however, the lead-out wiring may be a horizontal wiring extending in a direction orthogonal to the first direction and led out to a side surface of the magnetic layer.

EXAMPLE

Figure 7:
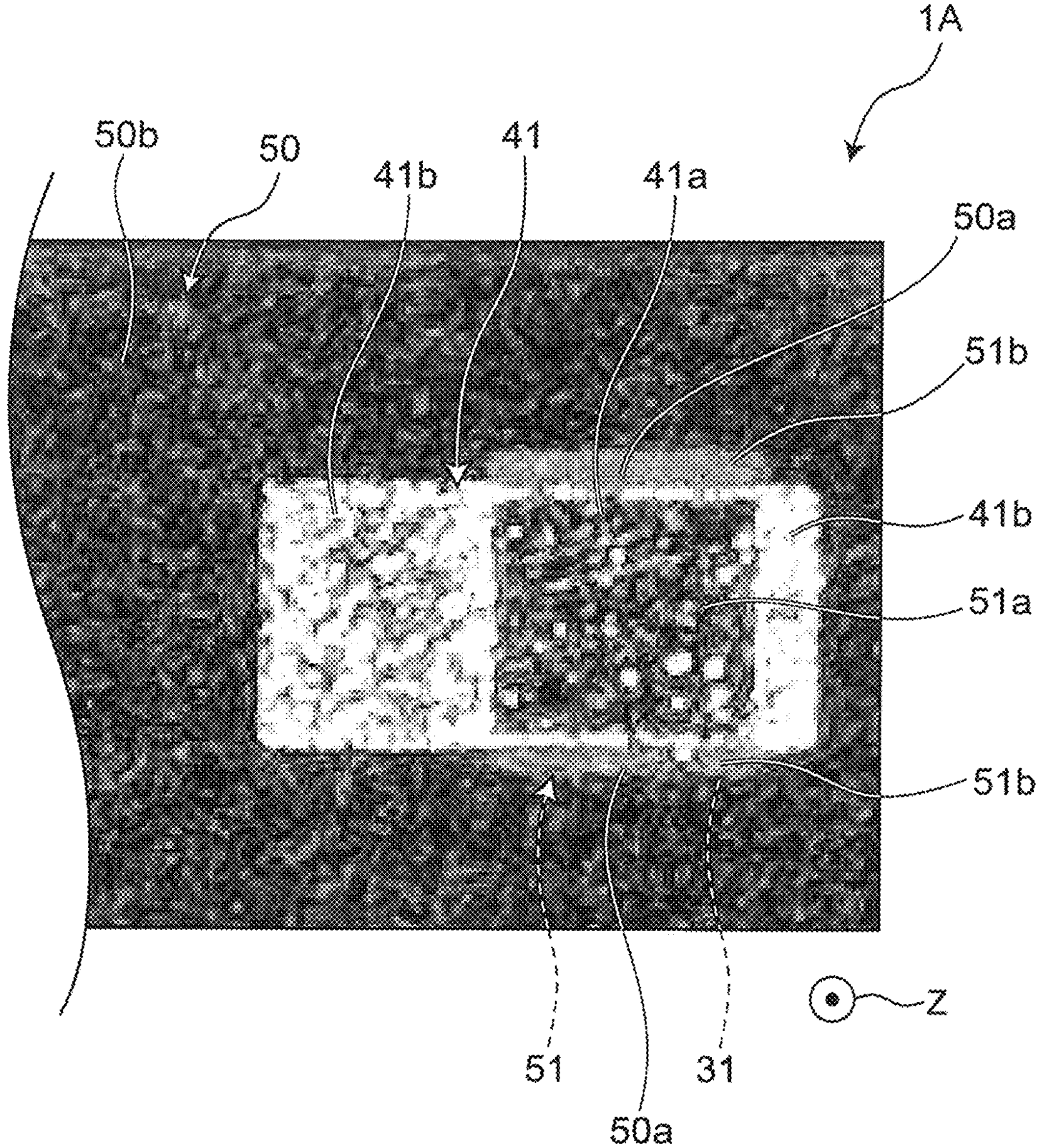
FIG. 7 is a view of an image showing an example of the second embodiment.

FIG. 7 shows an example of the second embodiment (FIG. 4). As shown in FIG. 7, in the first external terminal 41, the overlapping portion 41*a* and the non-overlapping portion 41*b* have different reflection spectra. Specifically, the arithmetic average roughness of the non-overlapping portion 41*b* is larger than the arithmetic average roughness of the overlapping portion 41*a*. Therefore, the overlapping portion 41*a* and the non-overlapping portion 41*b* are different in brightness and hue, and the overlapping portion 41*a* becomes darker than the non-overlapping portion 41*b*, so that the overlapping portion 41*a* and the non-overlapping portion 41*b* can visually be identified. The portions visually identifiable in this way can easily be classified.

In the coating film 50, the first portion 50*a* and the second portion 50*b* have different reflection spectra. Specifically, the first portion 50*a* and the second portion 50*b* are different in brightness, and the second portion 50*b* is darker than the first portion 50*a*, so that the first portion 50*a* and the second portion 50*b* can visually be identified.

What is claimed is:

1. An inductor component comprising:

a main body part including a magnetic layer containing a resin and a metal magnetic powder contained in the resin;

an inductor wiring disposed in the main body part on a plane;

an external terminal exposed from the main body part, an outer surface of the external terminal including a concave part; and a lead-out wiring extending perpendicular to the plane and perpendicular to the external terminal, the lead-out wiring positioned directly between the inductor wiring and the external terminal, the lead-out wiring electrically connecting the inductor wiring and the external terminal, the concave part positioned in a section of the external terminal that overlaps the lead-out wiring in a view of the concave part along a line extending through and parallel to the lead-out wiring, and in the same view of the concave part along the line extending through and parallel to the lead-out wiring, a width of the lead-out wiring in a first direction is greater than a width of the external terminal in the first direction such that the lead-out wiring extends beyond the width of the external terminal.

2. The inductor component according to claim 1, wherein the external terminal includes an overlapping portion located on the lead-out wiring and a non-overlapping portion located on the magnetic layer, outermost locations of the outer surface of the external terminal between the concave part and an end of the external terminal have a first plane in common and the concave part extends along a second plane offset from the first plane, and an only one concave part is present on an outer surface of the overlapping portion.

3. The inductor component according to claim 1, wherein the lead-out wiring is a vertical wiring penetrating the magnetic layer in a direction orthogonal to a principal surface of the magnetic layer.

4. The inductor component according to claim 1, wherein the external terminal includes a plurality of conductor layers.

5. The inductor component according to claim 4, wherein an outermost layer of the external terminal contains Au or Sn.

6. The inductor component according to claim 4, wherein a lowermost layer of the external terminal contains Cu.

7. The inductor component according to claim 6, wherein the lowermost layer contains 95 wt % or more Cu, and from 1 wt % to 5 wt % Ni.

8. The inductor component according to claim 4, wherein the lowermost layer of the external terminal is made of Ni or contains Ni.

9. The inductor component according to claim 1, wherein the external terminal includes a crack.

10. The inductor component according to claim 1, wherein a depth of the concave part is from 5% to less than 100% relative to a thickness of the external terminal other than the concave part.

11. The inductor component according to claim 1, wherein a depth of the concave part is from 0.5 μm to 10 μm.

12. The inductor component according to claim 1, wherein the lead-out wiring extends onto the magnetic layer.

13. The inductor component according to claim 1, wherein a surface of the lead-out wiring includes a concave groove, and the concave part is located at a position corresponding to the concave groove.

14. The inductor component according to claim 1, wherein based on a surface of the magnetic layer, a surface of the lead-out wiring is within a range of +5 μm to −10 μm in a direction perpendicular to the surface of the magnetic layer.

15. The inductor component according to claim 1, further comprising a coating film disposed on the surface of the magnetic layer, wherein the coating film is in contact with an outer circumferential edge of the external terminal.

16. The inductor component according to claim 15, wherein the external terminal is also disposed on the coating film.

17. The inductor component according to claim 15, wherein the coating film is also disposed on the surface of the lead-out wiring, and the coating film on the lead-out wiring and the coating film on the magnetic layer have different reflection spectra when light of a predetermined wavelength is applied from the outer surface side.

18. The inductor component according to claim 1, wherein the magnetic layer further contains a ferrite powder.

19. An inductor component comprising:

a main body part including a magnetic layer containing a resin and a metal magnetic powder contained in the resin;

an inductor wiring disposed in the main body part;

an external terminal exposed from the main body part, an outer surface of the external terminal including a concave part; and a lead-out wiring electrically connecting the inductor wiring and the external terminal, a width of the lead-out wiring is greater than a width of the concave part, wherein the external terminal includes an overlapping portion located on the lead-out wiring and a non-overlapping portion located on the magnetic layer, outermost locations of the outer surface of the external terminal between the concave part and an end of the external terminal have a first plane in common and the concave part extends along a second plane offset from the first plane, the concave part is located on an outer surface of the overlapping portion, and an arithmetic average roughness of the outer surface of the overlapping portion is smaller than an arithmetic average roughness of an outer surface of the non-overlapping portion.

20. An inductor component comprising:

a main body part including a magnetic layer containing a resin and a metal magnetic powder contained in the resin;

an inductor wiring disposed in the main body part;

an external terminal exposed from the main body part, an outer surface of the external terminal including a concave part;

a lead-out wiring electrically connecting the inductor wiring and the external terminal, and a coating film disposed on the surface of the magnetic layer, wherein:

in a plan view, the concave part overlaps the lead-out wiring when viewing the concave part along a line extending perpendicularly from a center of the concave part; and the lead-out wiring includes an extending part disposed between the main body and the coating film.

* * * * *